US012680380B1

(12) United States Patent
Murray

(10) Patent No.: US 12,680,380 B1
(45) Date of Patent: Jul. 14, 2026

(54) AUTOMATIC TENSIONING SIDE TRACK ASSEMBLY FOR AN OPERABLE SCREEN

(71) Applicant: Michael Murray, Jacksonville, FL (US)

(72) Inventor: Michael Murray, Jacksonville, FL (US)

( * ) Notice: Subject to any disclaimer, the term of this patent is extended or adjusted under 35 U.S.C. 154(b) by 174 days.

(21) Appl. No.: 18/638,142

(22) Filed: Apr. 17, 2024

Related U.S. Application Data

(63) Continuation-in-part of application No. 18/327,414, filed on Jun. 1, 2023, now Pat. No. 12,018,527.

(60) Provisional application No. 63/382,782, filed on Nov. 8, 2022.

(51) Int. Cl.
*E06B 9/58* (2006.01)
*E06B 9/42* (2006.01)

(52) U.S. Cl.
CPC ................ *E06B 9/581* (2013.01); *E06B 9/42* (2013.01)

(58) Field of Classification Search
CPC .................................. E06B 9/42; E06B 9/581
See application file for complete search history.

(56) References Cited

U.S. PATENT DOCUMENTS

| | | | | |
|---|---|---|---|---|
| 7,793,702 | B2 * | 9/2010 | Biewer | B60J 7/0015 296/214 |
| 8,607,841 | B2 * | 12/2013 | Hayashiguchi | E06B 9/581 160/273.1 |
| 9,719,292 | B1 | 8/2017 | James et al. | |
| 10,036,198 | B2 | 7/2018 | James et al. | |
| 10,260,279 | B2 * | 4/2019 | Nakae | E06B 9/40 |
| 11,326,395 | B2 * | 5/2022 | Heissenberg | E06B 9/54 |
| 11,421,474 | B2 | 8/2022 | James et al. | |
| 12,018,527 | B2 * | 6/2024 | Murray | E06B 9/42 |
| 12,312,862 | B2 * | 5/2025 | Heissenberg | E06B 9/72 |
| 2015/0041076 | A1 * | 2/2015 | Andre de la Porte | E06B 9/581 160/266 |
| 2021/0148166 | A1 * | 5/2021 | Fischer | E06B 9/58 |

* cited by examiner

*Primary Examiner* — Beth A Aubrey
(74) *Attorney, Agent, or Firm* — Ashkan Najafi

(57) ABSTRACT

An automatic tensioning side track assembly includes a base track having a first side and a second side opposed therefrom, a screen receiver being adjustably positioned within the base track and configured to reciprocate between the first side and the second side, a first magnet being engaged with the screen receiver, and a second magnet being engaged with the base track and positioned proximate to the second side. The first magnet and the second magnet are configured to automatically repel each other such that the first magnet is displaced away from the second magnet after the first magnet reaches a threshold position proximate to the second magnet. A repelling magnetic force between the first magnet and the second magnet is configured to increase as the first magnet moves towards the second magnet.

20 Claims, 4 Drawing Sheets

AUTOMATIC TENSIONING SIDE TRACK ASSEMBLY FOR AN OPERABLE SCREEN

CROSS REFERENCE TO RELATED APPLICATIONS

This is a continuation-in-part patent application that claims the priority to and benefit of co-pending U.S. non-provisional patent application Ser. No. 18/327,414, filed Jun. 1, 2023, which claims priority to and benefit of U.S. provisional patent application no. 63/382,782, filed Nov. 8, 2022, which are incorporated by reference herein in their entireties.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to retractable screen assemblies and, more particularly, to an automatic tensioning side track assembly that repels same magnet polarities (e.g., two positive magnetic polarities or two negative magnetic polarities) away from each other for maintaining a retractable screen of a retractable screen enclosure (e.g., patio) assembly at a desired tensioned state while external shear and tension forces are exerted against the retractable screen during ambient weather conditions and repetitive use over extended time periods.

Prior Art

Protective screens are typically motorized such that the operator presses a button on a remote control causing the screens to raise or lower within a framework that is attached to the building. Typically, an operable screen system is comprised of several principal components made up of sub-assemblies. First, there is generally a take up box for the screen, which may be called a hood assembly and is a horizontally mounted enclosure box with a screen take-up reel inside and a motor within the reel to drive the reel. Second, there are tracks running along the sides of the opening that engage the screen edges such that the screen edges are held captive but also able to slide up and down easily within the track. Third is a weighted bar on the bottom of a screen. The weighted bar is attached to the screen bottom edge and assists with pulling the screen down through gravitational force when the motor is operated in a reverse direction from the lift direction. These three components make up the frame for the operable screen assembly. The last element of an operable screen system is the screen itself. The screen is attached to the reel which acts as a storage mechanism and the screen edges are engaged with the side tracks to prevent the screen edges from pulling out of the tracks.

Unfortunately, over time and extended use, the screen is exposed to external shear and tension forces caused by objects, wind, repeated use, etc. Such external shear and tension forces may stretch the screen and cause a baggy look to the screen which is undesirable to the user.

A number of ways have been described by prior art to retain a screen edge within a side track. This is desirable for a number of reasons because a captive screen gives a sealed screen edge so insects cannot get around the screen edges. This is also desirable for screens that block sunlight, wind, cold weather, and rain. Retaining a screen edge is desirable but it is also desirable to maintain the deployed screen to appear as flat as possible to improve the aesthetics of the deployed screen. A flat screen is best achieved when there is a mechanism for adjusting the side track to increase or decrease the tension of the screen between the side tracks. Prior art attempts to provide an adjustable screen are not sufficiently functional (e.g., magnets susceptible to corrosion—shortened useful life—due to open magnet channels), or are larger than they need be, or have to be produced at a higher cost due to excessive material usage.

In particular, in U.S. Pat. Nos. 9,719,292; 10,036,198; and 11,421,474 ('292, '198, and '474) prior art patents shown in FIGS. 7-8, disclose open magnet channels, which exposes the magnets to the ambient atmospheric elements (e.g., water, debris, etc.), which will lead to magnet corrosion. The shortcoming is that the magnets are more than 60% iron and have a thin nickel plating layer. Once this plating is scratched or damaged, the corrosion proceeds rapidly. Once a magnet corrodes, it will lose its magnetism and the magnetic tensioning mechanism will no longer function. For a product that is primarily outdoors, this is an issue because the screen assemblies are exposed to ambient atmospheric elements, especially if tracks are part of a patio near a chlorinated pool or near the ocean where salt is in the air. Salt and chlorine are both strong electrolytes which are suspended in the air and when these contaminants find their way to into the open magnet channels and settle in between the magnets and the aluminum magnet channel, corrosion sets in rapidly.

Because it is common for such screen tracks to be used at a patio, near a pool or an ocean, it is a common occurrence for the magnets to corrode. The issue is the electrolysis that occurs between dissimilar metals when exposed to an electrolyte. To combat corrosion there are two options, permanently electrically isolate the materials or isolate the materials from the electrolytes.

It is impractical to permanently electrically isolate the magnets from the receiving channel for several reasons. One is that debris will pile up inside the open channel that will collect electrolytes and form a conductive bridge between the isolated components. Another reason why this is impractical is that a coating applied to the magnet such as epoxy, has a relatively short lifespan and any microscopic surface scratch will still lead to corrosion.

Studies have shown that under conditions of accelerated weathering tests on nickel plated neodymium magnets, where the magnets are submerged in salt water, corrosion begins within a matter of days and by 6 weeks, the magnets are significantly deteriorated thereby ending their useful life.

Furthermore, referring to FIGS. 7-8 (prior art) the aforementioned prior art has inner screen tracks that can be removed from the open side of the channel if the wind is strong. Such removably is an inherent shortcoming because it is also how the inner track is inserted into the channel. Thus, any condition, such as strong winds from the side that would make the screen flap, could reproduce the angular movements that are used to insert the screen track into the channel.

In addition, under high screen loads, tension forces pushing against the retaining tabs will cause the side walls of the outer track to deform and the inner track to pop out. We can see this in our finite element analysis (FEA) where the sidewalls of the outer channel are pushed away from each other. The ineffectiveness of the prior art at keeping the screen receiver within the base track is further demonstrated by the prior art needing the additional reinforcing sleeves for their design.

Notably, U.S. Pat. Nos. 9,719,292; 10,036,198; and 11,421,474 ('292, '198, and '474 prior art patents) disclose rectilinear prongs that merely engage along a single plane. Such prongs are not suitable for maintaining the screen receiver within the base track when the screen is subject to heavy shear and tensile loads caused by exterior forces (e.g., wind, objects, etc.). In other words, the screen receiver is more likely to disconnect and eject from the base track thereby causing screen operation failure. Reinserting the screen receiver into the base track requires undesirable time and energy.

Accordingly, a need remains for an automatic tensioning side track assembly to overcome at least one aforementioned shortcoming. The exemplary embodiment(s) satisfy such a need by providing an automatic tensioning side track assembly that repels same magnet polarities (e.g., two positive magnetic polarities or two negative magnetic polarities) away from each other, which is convenient and easy to use, lightweight yet durable in design, versatile in its applications, and configured for maintaining a retractable screen of a retractable screen enclosure (e.g., patio) assembly at a desired tensioned state while external shear and tension forces are exerted against the retractable screen during ambient weather conditions and repetitive use over extended time periods (e.g., the prongs of the present disclosure keep the sidewalls from deforming and thereby prevent the screen track from coming out of the outer channel).

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide an automatic tensioning side track assembly that repels same magnet polarities (e.g., two positive magnetic polarities or two negative magnetic polarities) away from each other for maintaining a retractable screen of a retractable screen enclosure (e.g., patio) assembly at a desired tensioned state while external shear and tension forces are exerted against the retractable screen during ambient weather conditions and repetitive use over extended time periods. These and other objects, features, and advantages of the non-limiting exemplary embodiment(s) are provided by an automatic tensioning side track assembly for maintaining a retractable screen of a retractable screen enclosure assembly at a desired tensioned state. The automatic tensioning side track assembly includes a base track having a first side and a second side opposed therefrom, a screen receiver being adjustably positioned within the base track and configured to reciprocate between the first side and the second side, a first magnet being engaged with the screen receiver, and a second magnet being engaged with the base track and positioned proximate to the second side. Advantageously, the first magnet and the second magnet are configured to automatically repel each other such that the first magnet is displaced away from the second magnet after the first magnet reaches a threshold position proximate to the second magnet. Advantageously, a repelling magnetic force between the first magnet and the second magnet is configured to increase as the first magnet moves towards the second magnet. Notably, the base track is stationary and the screen receiver is dynamic relative to the base track.

In a non-limiting exemplary embodiment, the first magnet is configured to be dynamic relative to a stationary position of the second magnet.

In a non-limiting exemplary embodiment, the automatic tensioning side track assembly further includes a screen is passed through the second side of the base track and further being attached to the screen receiver.

In a non-limiting exemplary embodiment, the screen is configured to lose tension and bow as the first magnet is displaced towards the second magnet. Advantageously, the screen receiver is configured to gain tension and straighten as the first magnet is displaced away from the second magnet.

In a non-limiting exemplary embodiment, the second magnet is stationary relative to the base track and relative to the screen receiver. Advantageously, the second magnet is stationary relative to the first magnet.

In a non-limiting exemplary embodiment, the first magnet is configured to selectively reciprocate along a bi-directional travel path between the first side of the base track and the second magnet.

In a non-limiting exemplary embodiment, the screen receiver is configured to remain within the base track and further configured to be prohibited from exiting the base track while the first magnet travels towards and away from the second magnet.

In a non-limiting exemplary embodiment, the screen receiver includes a first magnet channel statically affixed thereto wherein the first magnet is entirely seated within the first magnet channel. Advantageously, the first magnet channel has a continuous outer wall being extended about an entire perimeter of the first magnet.

In a non-limiting exemplary embodiment, the base track includes a second magnet channel statically affixed thereto wherein the second magnet is entirely seated within the second magnet channel. Advantageously, the second magnet channel has a continuous outer wall being extended about an entire perimeter of the second magnet.

In a non-limiting exemplary embodiment, the second magnet channel is located proximate to the second side of the base track. Advantageously, the second magnet channel is configured to prohibit the first magnet channel from reaching the second side of the base track.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
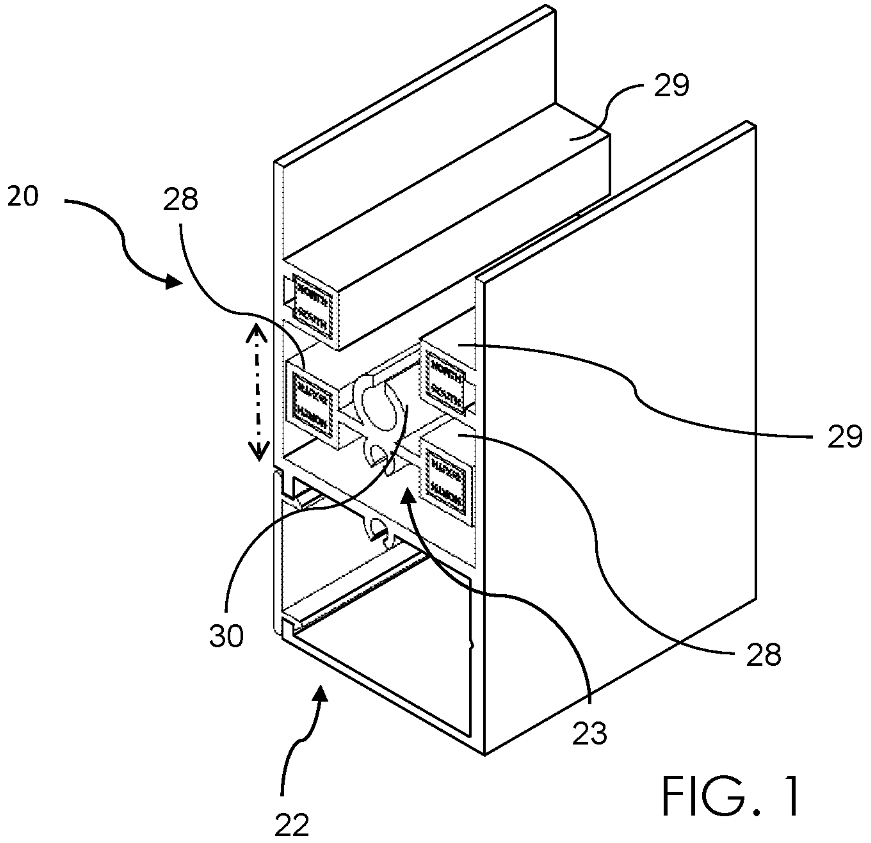
FIG. 1 is a perspective view of an automatic tensioning side track assembly that repels same magnet polarities (e.g., two positive magnetic polarities or two negative magnetic polarities) away from each other for automatically tensioning a screen employed by a retractable screen assembly, in accordance with a non-limiting exemplary embodiment of the present disclosure.
Figure 2:
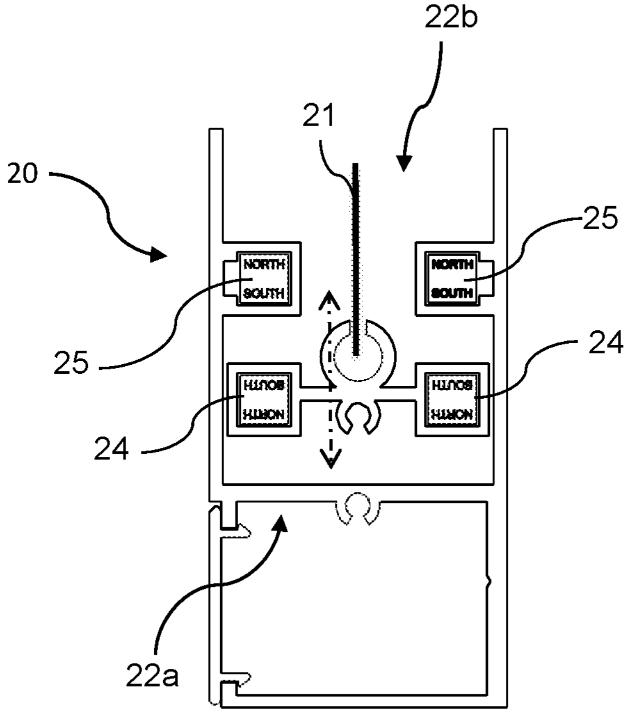
FIG. 2 is a top plan view of the automatic tensioning side track assembly shown in FIG. 1, wherein a screen is attached to a screen receiver.
Figure 3:
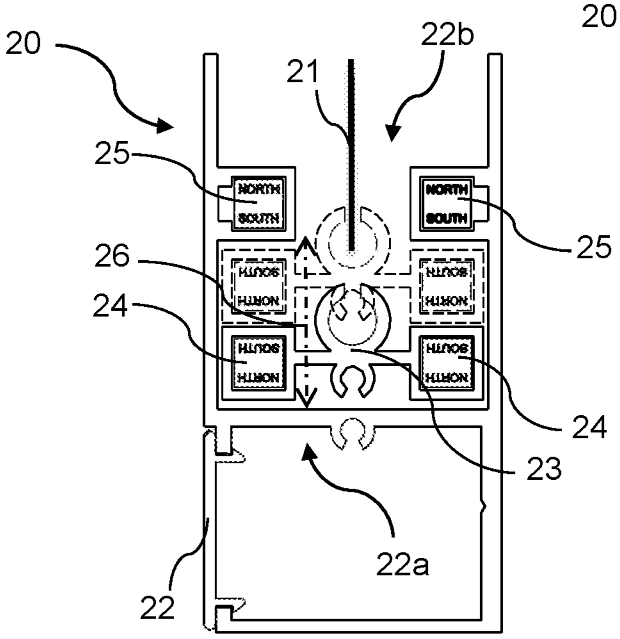
FIG. 3 is another top plan view of the automatic tensioning side track assembly shown in FIG. 1, showing the bi-directional reciprocating movement of the first magnet relative to the stationary position of the second magnet.
Figure 4:
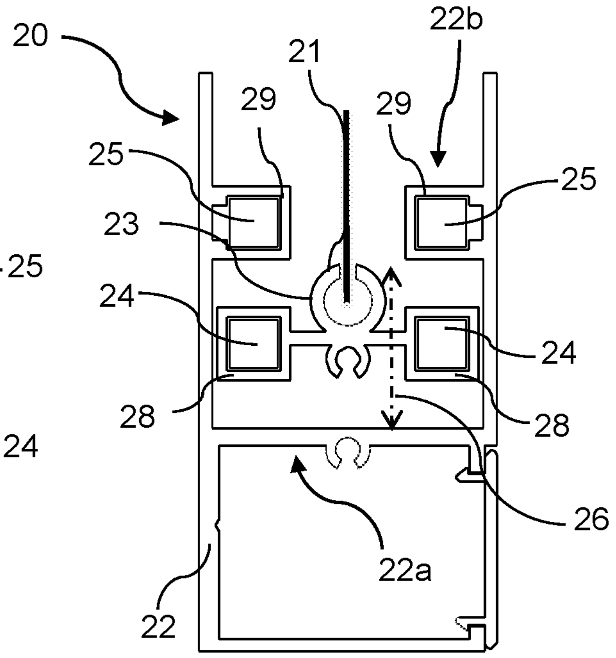
FIG. 4 is bottom plan view of the automatic tensioning side track assembly shown in FIG. 1.
Figure 5:
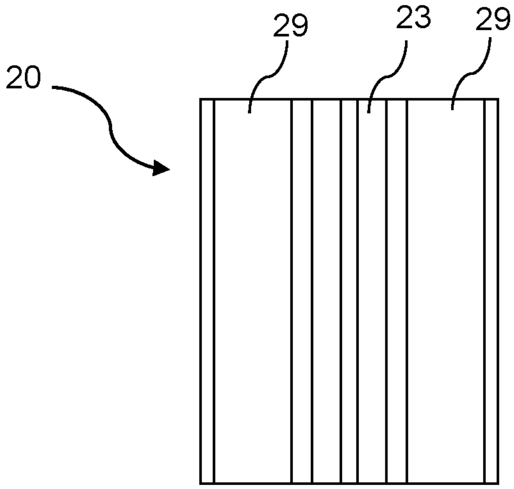
FIG. 5 is a front elevational view of the automatic tensioning side track assembly shown in FIG. 1.
Figure 6:
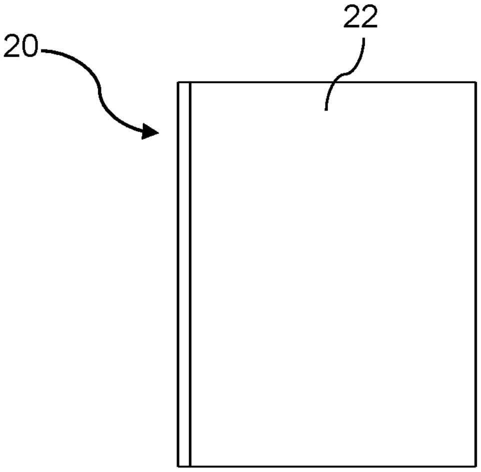
FIG. 6 is a rear elevational view of the automatic tensioning side track assembly shown in FIG. 1.
Figure 7:
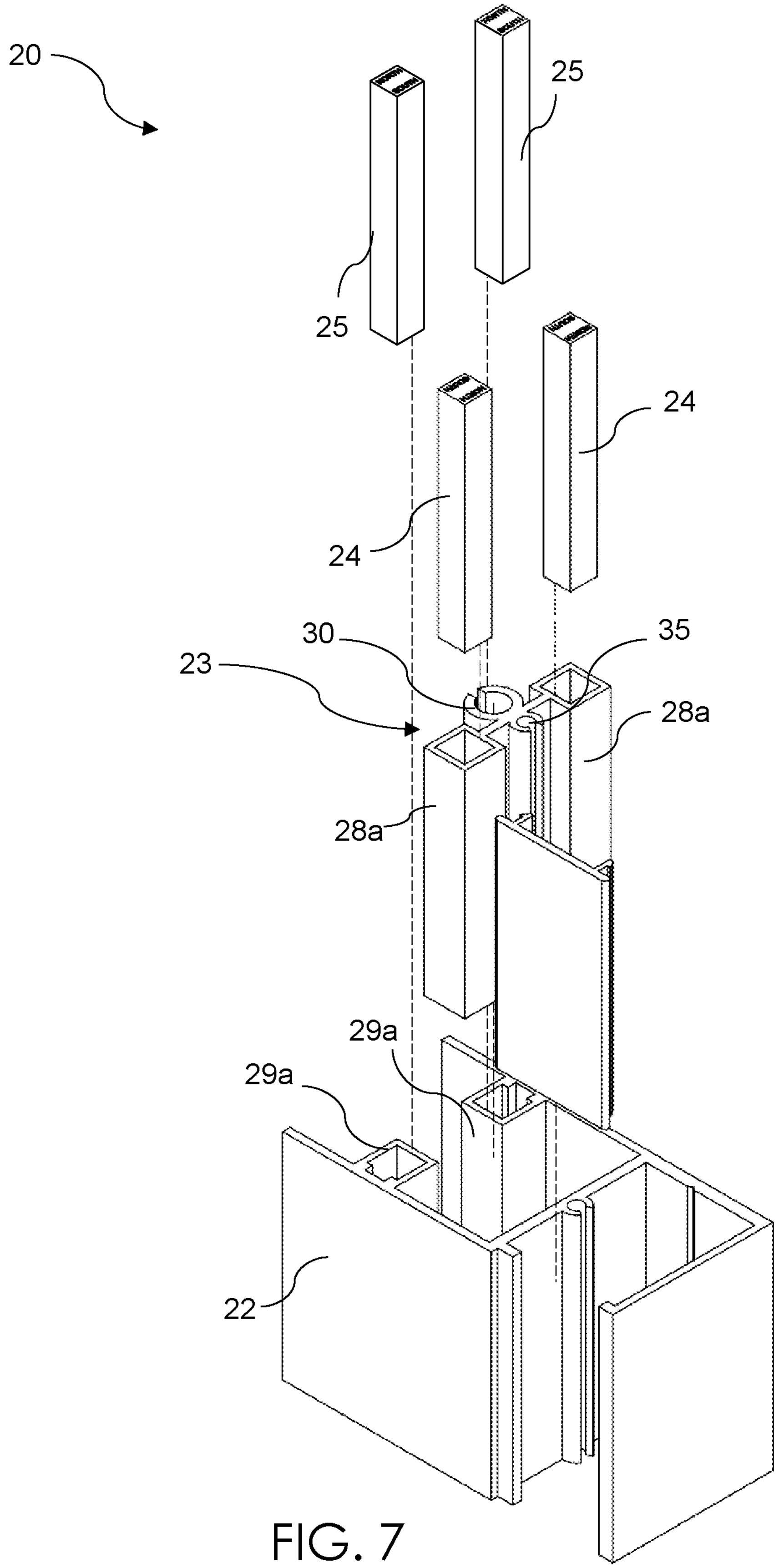
FIG. 7 is an exploded view of the automatic tensioning side track assembly shown in FIG. 1.
Figure 8:
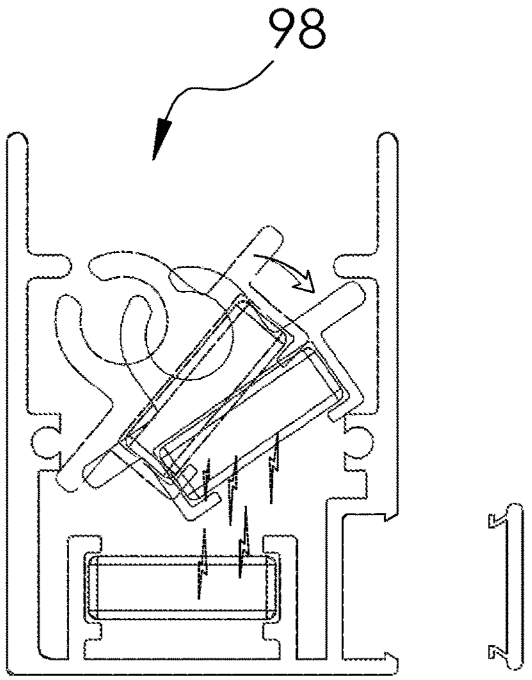
FIG. 8 (PRIOR ART)
Figure 9:
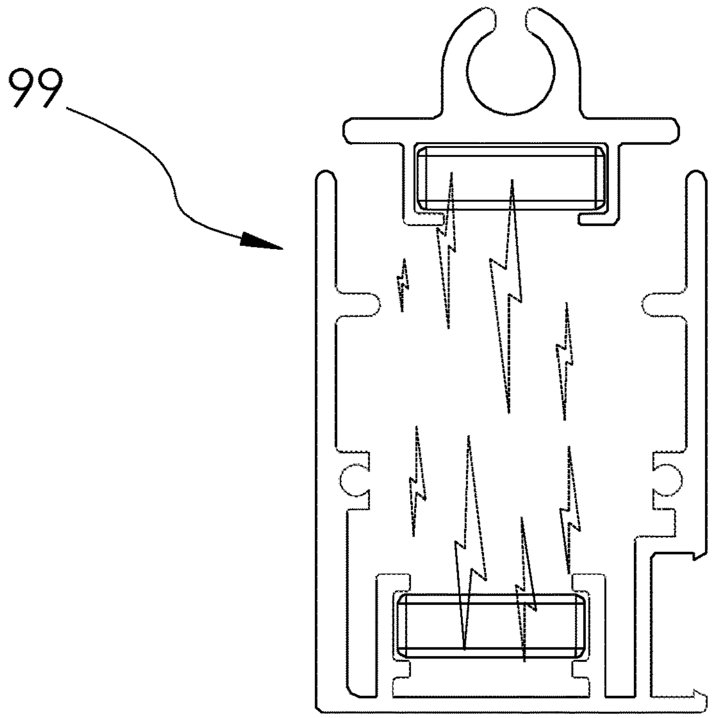
FIG. 9 (PRIOR ART)

FIG. 8 (prior art) is a top plan view of U.S. Pat. No. 9,719,292 showing rectilinear prongs at both the screen receiver and base track, which are ineffective for maintaining the screen receiver within the base track. Also shown are open magnet channels that are exposed to fluid and debris, which facilitate magnet corrosion and reduce their useful life; and FIG. 9 (prior art) is a top plan view of U.S. Pat. No. 9,719,292 showing its screen track being removable from its base track especially when shear and tension forces are exerted against the screen.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means ±15% of the numerical.

If used herein, "substantially" means largely if not wholly that which is specified but so close that the difference is insignificant.

The non-limiting exemplary embodiment(s) is/are referred to generally in FIGS. 1-7 and is/are intended to provide an innovative automatic tensioning side track assembly 20 that repels same magnet polarities (e.g., two positive magnetic polarities or two negative magnetic polarities) away from each other. The automatic tensioning side track assembly 20 automatically maintains a retractable screen 21 of a retractable screen enclosure (e.g., patio and door enclosures) system at a desired tensioned state while external shear and tension forces are exerted against the retractable screen 21 during ambient weather conditions and repetitive use over extended time periods. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21. Furthermore, the side track assembly 20 can withstand external forces while having a reduced cross-sectional thickness and without requiring a separate outer protective sleeve (which is required by the cited prior art 98, 99 in FIGS. 8, 9, respectively). Such advantages yield the unexpected result of less material costs, less weight, and less components to assemble during installation and maintenance disassembly.

Referring to FIGS. 1-7 in general, the automatic tensioning side track assembly 20 includes a base track 22 having a first side 22*a* and a second side 22*b* opposed therefrom, a screen receiver 23 being adjustably positioned within the base track 22 and configured to reciprocate between the first side 22*a* and the second side 22*b*, a first magnet 24 being engaged with the screen receiver 23, and a second magnet 25 being engaged with the base track 22 and positioned proximate to the second side 22*b*. Advantageously, the first magnet 24 and the second magnet 25 are configured to automatically repel each other such that the first magnet 24 is displaced away from the second magnet 25 after the first magnet 24 reaches a threshold position proximate (towards) to the second magnet 25. Advantageously, a repelling magnetic force between the first magnet 24 and the second magnet 25 is configured to increase as the first magnet 24 moves towards the second magnet 25. Notably, base track 22 is stationary and the screen receiver 23 is dynamic relative to the base track 22. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, there are a plurality of first magnets 24 and a plurality of second magnets 25 aligned therewith such that a first one of the first magnets 24 faces a first associated one of the second magnets 25. Likewise, a second one of the first magnets 24 faces a second associated one of the second magnets 25. For example, each of the first magnets 24 and second magnets 25 have a positive polarity on one side thereof and a negative polarity on an opposed side thereof, respectively. In this manner, the same polarity sides of each first and second magnets 24, 25 face each other (e.g., positive (north) sides face each other, or negative (south) sides face each other) thereby creating repelling magnetic forces. Such repelling magnetic forces are critical for automatically repelling the first magnet 24 away from the second magnet 25 and thereby automatically maintaining the screen 21 at a tight (tensioned, not bowed) state. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, the first magnet 24 is configured to be dynamic relative to a stationary position of the second magnet 25. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, the automatic tensioning side track assembly 20 further includes a screen 21 passed through the second side 22*b* of the base track 22 and further being adjustably attached to the screen receiver 23. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, the screen 21 is configured to lose tension and bow as the first magnet 24 is displaced towards (by external forces such as wind, etc.) the second magnet 25. Advantageously, the screen 21 is configured to gain tension and straighten as the first magnet 24 is displaced away from (by repelling magnetic forces) the second magnet 25. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, the second magnet 25 is stationary relative to the base track 22 and relative to the screen receiver 23. Advantageously, the second magnet 25 is stationary relative to the first magnet 24. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, the first magnet 24 is configured to selectively reciprocate along a bi-directional travel path 26 between the first side 22*a* of the base track 22 and the second magnet 25. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, the screen receiver 23 is configured to remain within the base track 22 and further configured to be prohibited from exiting the base track 22 while the first magnet 24 travels both towards and away from the second magnet 25. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, screen receiver 23 includes a first magnet channel 28 statically affixed thereto wherein the first magnet 24 is entirely seated within the first magnet channel 28. Advantageously, the first magnet channel 28 has a continuous outer wall 28*a* being extended about an entire perimeter of the first magnet 24. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, the base track 22 includes a second magnet channel 29 statically affixed thereto wherein the second magnet 25 is entirely seated within the second magnet channel 29. Advantageously, the second magnet channel 29 has a continuous outer wall 29*a* being extended about an entire perimeter of the second magnet 25. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

In a non-limiting exemplary embodiment, the second magnet channel 29 is located proximate to the second side 22*b* of the base track 22. Advantageously, the second magnet channel 29 is configured to prohibit the first magnet channel 28 from reaching the second side 22*b* of the base track 22. Such a structural configuration yields the new, useful, and unpredicted result of automatically tensioning the retractable screen 21 from an undesired tensioned state (bowed, loose) to a desired tensioned state (straight, tight) by automatically dampening (dissipating) the shear and tension external forces exerted against the retractable screen 21.

Referring to FIGS. 1-7 in general, in a non-limiting exemplary embodiment, base track 22, screen receiver 23, and screen track 30 are made from extruded aluminum and, as such, the mechanical elements of the side track assembly 20 are incorporated into the structural configuration of the aluminum extrusion thereby reducing manufacturing time and expensive. Base track 22 may have a U-channel shape with a cavity on the back side to allow fasteners to secure the base track 22 to a support structure (wall, post, or the like) and then hidden by a snap fit cover or the like. Electrical wires may be run through the back side cavity. Additionally, screw bosses may be incorporated into the base track 22 for attaching a top cover plate and a bottom cover plate thereto.

In a non-limiting exemplary embodiment, screen track 30 is part of the screen receiver 23 and may have a C-channel shape with an open side in which a screen 21 bead edge linearly slides. Advantageously, the first magnet channels 28 adjustably lock the screen track 30 within the base track 22 when under load. The magnets 24, 25 are held captive within their respective channels 28, 29, respectively, (which can be dedicated channels) at the base track 22 and at the screen receiver 23, respectively. These dedicated magnet channels 28, 29 securely hold the magnets 24, 25 at a specific distance away from each other (via a magnetic repelling force). The same polarity magnets 24, 25 are arranged to create a repelling force between the screen receiver 23 and the base track 22. This magnetic repelling force serves as the catalyst for automatically causing the screen 21 to straighten out to the desired tensioned state after the external force (shear or tension forces) depress the screen 21 to the undesired tensioned state (bent screen). Advantageously, the first magnet 24 is caused to reciprocate along a bi-directional linear travel path relative to a stationary position of the second magnet 25 of the base track 22. In particular, the first magnet 24 is initially at the desired tensioned state (substantially straight screen 21 shape) before the external forces are exerted thereagainst. When the external forces (wind, rain, objects) are exerted against the screen 21, the screen 21 (and first magnet 24 and screen receiver 23) are linearly displaced towards from the second magnet 25. Such displacement morphs the screen 21 to the undesired tensioned state (bent/loose screen 21 that is under extra stress). Then, the same magnetic polarities automatically cause the first magnet 24 (and screen receiver 23) to automatically repel away from the second magnet 25, so that the screen 21 is automatically returned to the initial desired tensioned state (substantially straight taut screen 21 shape).

In a non-limiting exemplary embodiment, the aligned magnet channels 28, 29 provide displacement stops for preventing the screen receiver 23 from traveling beyond the second magnet channel 29 (screen receiver 21 cannot exit the base track 22). Such a structural configuration yields the new, useful, and unpredicted result of maintaining the screen receiver 23 within the base track 22 even when the screen 21 is subject to heavy shear and tensile loads caused by exterior forces (e.g., wind, rain, objects, etc.).

In a non-limiting exemplary embodiment, base track 22 may have tapered tips to allow the base track 22 to receive and frictionally abut an adjacent base track 22, if needed.

In a non-limiting exemplary embodiment, the base track 22 cavity may have a depression configured to be a drill tip locator. Such a cavity is configured to receive a fastener therethrough while permitting electrical wires to pass therein. A cover plate is detachably affixed to the cavity.

In a non-limiting exemplary embodiment, the screen receiver 23 may have a screw boss 35 so a plastic injection molded screen pre-feeder (not shown) can be fastened directly to the screen receiver 23. It may be preferred to use such a screen pre-feeder for strengthening the screen receiver 23, which is exposed to the external forces and the magnetic repelling (sliding) forces between the dynamic first magnet 24 and the stationary second magnet 25. Additionally, the injection molded pre-feeder eliminates hand forming the screen 21 entry (leading bead edge) into an extrusion that would otherwise be needed.

In a non-limiting exemplary embodiment, referring to FIGS. 1-7, the automatic tensioning assembly 20 advantageously evenly tensions the screen 21 between the two oppositely facing magnet channels 28, 29 by using a magnetic repelling force between the first magnet 24 and the second magnet 25. Such first and second magnets 24, 25 act as a spring, pushing the first magnet 24 laterally away from the second magnet 25 (towards the first side 22*a* of base track 22). When external forces create a load on screen 21 (bend the screen 21 to a higher tensioned state), the first magnet 24 is initially pulled towards the corresponding second magnet 25 to relieve the higher tension. Then, the repelling magnetic force (caused by either two negative magnetic polarities or two positive magnetic polarities) between the first magnet 24 and the second magnet 25 automatically returns (pushes) the first magnet 24 back toward the first side 22*a* of the base track 22, thereby automatically flattening and tensioning the screen 21 to the desired tensioned state (straighten the screen 21).

In a non-limiting exemplary embodiment, when screen 21 is exposed to the external forces (higher loads) such as that induced by strong winds, rain, objects, undesired tension develops in the screen 21 overcoming the repelling magnetic forces of the magnets 24, 25. This undesired tension pulls and rotates the screen receiver 23 outward towards the second side 22*b* of the base track 22. Then, the dynamic first magnet channels 28 may engage the stationary second magnet channels 29 in the stationary base track 22 such that the screen receiver 23 locks against the base track 22 and is prohibited from disengaging (exiting) the base track 22. Screen 21, under a load, applies tension and shear forces to each side track and induces a torsional load (rotate) on the screen track 30. The same magnet polarities of the first and second magnets 24, 25 resist this torsional load and the repelling magnetic forces keep the side walls of the base track 22 from deforming from these loads. This interaction prevents screen receiver 23 from being pried (forced) out of base track 22. Because the shear loads are transferred and dissipated as tension loads along base track 22 side walls, the base track 22 wall thicknesses can be thinner thereby decreasing its manufacturing cost. Advantageously, a screen 21 edge bead is permitted to rotate within the C-channel of the screen track 30 to absorb and help dissipate the external forces acting on the screen 21.

Advantageously, the continuous outer walls 28*a*, 29*a* of the magnet channels 28, 29 prevent fluid and debris from entering the first magnet channel 28 and second magnet channel 29 thereby preventing undesirable corrosion of the magnets 24, 25. Such a structural configuration yields the new, useful, and unexpected result of shielding the first magnet 24 and second magnet 25 from undesirable fluid and debris, which extends the useful life of the first magnet 24 by solving the problem of early magnet corrosion. Optionally, the first magnet 24 and second magnet 25 may be coated with vinyl and/or zinc for additional corrosion resistance.

In a non-limiting exemplary embodiment, axially opposed ends of the magnet channels 28, 29 may be filled with silicon or another suitable substance, which is an effective way to limit magnet corrosion is to seal the magnets 24, 25 within the magnet channels 28, 29, so that no water or air penetrates therein. In this way, no electrolytes are introduced, and corrosion does not have the necessary conditions to occur. Rather than having open magnet channels (prior art), it is better to have closed channels, that can be sealed to protect the magnets 24, 25 from corrosion, respectively. Closed magnet channels need only be sealed at their respective opposed ends which can be achieved by a water proof caulk, silicon, tight fitting end cap, plug, blocks, or other similar features. Closed magnet channels that are sealed protect magnets 24, 25 from damage and prevent corrosion thereby preserving the useful life of magnets 24, 25 and allowing the automatic tensioning mechanism to last significantly longer.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. An automatic tensioning side track assembly for maintaining a retractable screen of a retractable screen enclosure assembly at a desired tensioned state, said automatic tensioning side track assembly comprising:

a base track having a first side and a second side opposed therefrom;

a screen receiver being adjustably positioned within said base track and configured to reciprocate between said first side and said second side;

a first magnet being engaged with said screen receiver; and a second magnet being engaged with said base track and positioned proximate to said second side;

wherein said first magnet and said second magnet are configured to automatically repel each other such that said first magnet is displaced away from said second magnet after said first magnet reaches a threshold position proximate to said second magnet;

wherein a repelling magnetic force between said first magnet and said second magnet is configured to increase as said first magnet moves towards said second magnet;

wherein said first magnet and said screen receiver are located proximately to said first side of said base track, wherein said second magnet is located distally to said first side of said base track;

wherein said second magnet is configured to physically block said first magnet from passing beyond said second magnet as said screen receiver moves away from said first side of said base track and towards said second side of said base track.

2. The automatic tensioning side track assembly of claim 1, wherein said first magnet is configured to be dynamic relative to a stationary position of said second magnet.

3. The automatic tensioning side track assembly of claim 1, further comprising:

a screen being passed through said second side of said base track and further being attached to said screen receiver.

4. The automatic tensioning side track assembly of claim 3, wherein said screen is configured to lose tension and bow as said first magnet is displaced towards said second magnet; wherein said screen is configured to gain tension and straighten as said first magnet is displaced away from said second magnet.

5. The automatic tensioning side track assembly of claim 1, wherein said second magnet is stationary relative to said base track and relative to said screen receiver; wherein said second magnet is stationary relative to said first magnet.

6. The automatic tensioning side track assembly of claim 1, wherein said first magnet is configured to selectively reciprocate along a bi-directional travel path between said first side of said base track and said second magnet.

7. The automatic tensioning side track assembly of claim 1, wherein said screen receiver is configured to remain within said base track and further configured to be prohibited from exiting said base track while said first magnet travels towards and away from said second magnet.

8. The automatic tensioning side track assembly of claim 1, wherein said screen receiver comprises: a first magnet channel statically affixed thereto, said first magnet being entirely seated within said first magnet channel, said first magnet channel having a continuous outer wall being extended about an entire perimeter of said first magnet.

9. The automatic tensioning side track assembly of claim 1, wherein said base track comprises: a second magnet channel statically affixed thereto, said second magnet being entirely seated within said second magnet channel, said second magnet channel having a continuous outer wall being extended about an entire perimeter of said second magnet.

10. The automatic tensioning side track assembly of claim 9, wherein said second magnet channel is located proximate to said second side of said base track, said second magnet channel being configured to prohibit said first magnet channel from reaching said second side of said base track.

11. An automatic tensioning side track assembly for maintaining a retractable screen of a retractable screen enclosure assembly at a desired tensioned state, said automatic tensioning side track assembly comprising:

a base track having a first side and a second side opposed therefrom;

a screen receiver being adjustably positioned within said base track and configured to reciprocate between said first side and said second side;

a first magnet being engaged with said screen receiver; and a second magnet being engaged with said base track and positioned proximate to said second side;

wherein said first magnet and said second magnet are configured to automatically repel each other such that said first magnet is displaced away from said second magnet after said first magnet reaches a threshold position proximate to said second magnet;

wherein a repelling magnetic force between said first magnet and said second magnet is configured to increase as said first magnet moves towards said second magnet;

wherein said base track is stationary and said screen receiver is dynamic relative to said base track;

wherein said first magnet and said second magnet are linearly aligned parallel to a bi-directional travel path and located proximate to an inner longitudinal wall of said base track and laterally offset from a center of said base track.

12. The automatic tensioning side track assembly of claim 11, wherein said first magnet is configured to be dynamic relative to a stationary position of said second magnet.

13. The automatic tensioning side track assembly of claim 11, further comprising:

a screen being passed through said second side of said base track and further being attached to said screen receiver.

14. The automatic tensioning side track assembly of claim 13, wherein said screen is configured to lose tension and bow as said first magnet is displaced towards said second magnet; wherein said screen is configured to gain tension and straighten as said first magnet is displaced away from said second magnet.

15. The automatic tensioning side track assembly of claim 11, wherein said second magnet is stationary relative to said base track and relative to said screen receiver; wherein said second magnet is stationary relative to said first magnet.

16. The automatic tensioning side track assembly of claim 11, wherein said first magnet is configured to selectively reciprocate along said bi-directional travel path between said first side of said base track and said second magnet.

17. The automatic tensioning side track assembly of claim 11, wherein said screen receiver is configured to remain within said base track and further configured to be prohibited from exiting said base track while said first magnet travels towards and away from said second magnet.

18. The automatic tensioning side track assembly of claim 11, wherein said screen receiver comprises: a first magnet channel statically affixed thereto, said first magnet being entirely seated within said first magnet channel, said first magnet channel having a continuous outer wall being extended about an entire perimeter of said first magnet.

19. The automatic tensioning side track assembly of claim 18, wherein said base track comprises: a second magnet channel statically affixed thereto, said second magnet being entirely seated within said second magnet channel, said second magnet channel having a continuous outer wall being extended about an entire perimeter of said second magnet.

20. The automatic tensioning side track assembly of claim 19, wherein said second magnet channel is located proximate to said second side of said base track, said second magnet channel being configured to prohibit said first magnet channel from reaching said second side of said base track.

* * * * *